(12) United States Patent
Honda et al.

(10) Patent No.: US 6,943,948 B2
(45) Date of Patent: Sep. 13, 2005

(54) FRESNEL LENS SHEET AND TRANSMISSION TYPE PROJECTION SCREEN

(75) Inventors: Makoto Honda, Tokyo (JP); Michihisa Ide, Tokyo (JP); Hiroshi Sekiguchi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 11/034,896

(22) Filed: Jan. 13, 2005

(65) Prior Publication Data

US 2005/0117213 A1 Jun. 2, 2005

Related U.S. Application Data

(63) Continuation of application No. 10/208,929, filed on Jul. 31, 2002, now abandoned.

(30) Foreign Application Priority Data

Aug. 8, 2001 (JP) .............................. 2001-240112

(51) Int. Cl.[7] ........................... G03B 21/60; G02B 3/08
(52) U.S. Cl. ..................................... 359/457; 359/742
(58) Field of Search .............................. 359/455, 456, 359/457, 742

(56) References Cited

U.S. PATENT DOCUMENTS

| | | | | |
|---|---|---|---|---|
| 3,712,707 A | * | 1/1973 | Henkes, Jr. | 359/457 |
| 3,718,078 A | * | 2/1973 | Plummer | 359/742 |
| 4,468,092 A | * | 8/1984 | Inoue et al. | 359/457 |
| 4,674,836 A | * | 6/1987 | Yata et al. | 359/457 |
| 4,721,361 A | * | 1/1988 | van de Ven | 359/457 |
| 5,477,380 A | * | 12/1995 | Watanabe et al. | 359/457 |
| 5,513,036 A | * | 4/1996 | Watanabe et al. | 359/457 |

* cited by examiner

*Primary Examiner*—Christopher Mahoney
(74) *Attorney, Agent, or Firm*—Timothy J. Keefer; Seyfarth Shaw LLP

(57) ABSTRACT

A Fresnel lens sheet comprises a Fresnel lens on one surface thereof, wherein respective unit surfaces constructing the Fresnel lens sheet have rough surfaces. Since it has a rough surface, it enables suppressing the occurrence of moire, when making up a screen. The other Fresnel lens sheet comprises a Fresnel lens on one surface thereof, and a fly-eye lens or prisms as a regular concavities and convexities configuration for suppressing regular reflection on the surface thereof on a side opposite to the side having the Fresnel lens formed thereon. Since it has on its rear surface a fly-eye lens or a prism, it enables suppressing the occurrence of ghost image.

13 Claims, 4 Drawing Sheets

FRESNEL LENS SHEET AND TRANSMISSION TYPE PROJECTION SCREEN

CROSS REFERENCE TO RELATED APPLICATION

This application is a Continuation of U.S. patent application Ser. No. 10/208,929 entitled "FRESNEL LENS SHEET AND TRANSMISSION TYPE PROJECTION SCREEN", filed Jul. 31, 2002 now abandoned which claims priority of Japanese patent application serial number 2001.

BACKGROUND OF THE INVENTION

1. Field of the Invention

The present invention relates to an improved transmission type screen which is used in the so-called projection type television having a projector and a screen accommodated in one cabinet and makes it possible to view a clear image with no ghost image or moire following the image, and a Fresnel lens sheet used therein.

2. Description of the Related Art

As a television whose viewing screen size is large, there is the so-called projection type television wherein an image is projected from a rear surface thereof and is watched or viewed from a front surface.

As illustrated in FIGS. 5A and 5B, a conventional projection type television 31 is the one wherein a screen 101 is fitted to a bored window portion at the upper part of its front surface of a cabinet 10; a projector 2 is disposed at a lower position of the interior thereof; and a mirror 3 for making small the depth of the cabinet 10 is disposed at the upper position of its rear surface. Each of these members is disposed in the way of having a positional relationship which permits the projection light 4 from the projector 2 to be reflected by the mirror 3 and projected onto the screen 101, and is received within the same cabinet and fixed. It is to be noted that, for clarifying the interior of the cabinet 10, in each of the illustrations, the side surfaces are removed.

As a screen 101 in the conventional projection type television 31 there is used the one in which, as illustrated in FIG. 6, a Fresnel lens sheet 111 is disposed on the rear surface side, and a lenticular lens sheet 121 is disposed on the watching, or viewing, side, in the way in which the both are located close to each other.

The lenticular lens sheet 121, as one example, has on the rear surface side, i.e. the Fresnel lens sheet 111 side a lenticular lens 122 configured in the way in which a lot of unit lenticular lenses are arrayed so that the direction of the groove defined between each two of the unit lenticular lenses may be in coincidence with the vertical direction of the screen. It has on the viewing side of the lenticular lens sheet 121 and at the position corresponding to a non-condensing portion of the lenticular lens 122 of the rear surface side a light-shading layer 123 for preventing the reflection of a light having entered from the viewing side.

The Fresnel lens sheet 111, as one example, has a Fresnel lens 112 on the viewing side, i.e. the lenticular lens sheet 121 side and has a flat surface 114 on the rear surface side, i.e. the projecting side.

As illustrated in FIG. 7, when a projection light 4 is projected from the rear surface onto the Fresnel lens sheet 111 in the above-described screen 101, this projection light 4 transmits through the Fresnel lens sheet 111 and, in addition, other than this, a reflected light 4a occurs upon the rear surface of the Fresnel lens sheet 111. As illustrated in FIG. 5B, the reflected light 4a reflected by the rear surface of the Fresnel lens sheet 111 is reflected again by the mirror 3 and thereafter enters the screen 101 again. Since this incident light enters the screen at a position different from the initial incident position of the projection light 4, a ghost image occurs at the shifted position in addition to the original image to become a cause of the so-called "ghost".

Especially, the shorter the length of the optical path between the projector 2 and the screen 101, i.e. the projection distance is, or/and, the shorter the distance between the screen 101 and the mirror 3 is, the more likely to occur the ghost is.

Various kinds of attempts for dissolving the occurrence of ghost have heretofore also been made. According to, among them, the attempt to form an anti-reflection layer on the rear surface of the screen by deposition, or the like, it is indeed possible to weaken the intensity of the ghost but it is impossible to dissolve the ghost. Also, performing deposition with respect to the rear surface of the individual screen results in the poor manufacturing efficiency and so cannot be said to be a technique suitable from the industrial point of view.

Further, in Japanese Patent Application Laid-Open No. 5-158153, the technique is disclosed of providing on the rear surface of the Fresnel lens sheet a configuration of concavities and convexities such as satin, hair line, or lenticular lens and, in this case, providing especially a horizontal lenticular lens configured to get the direction of the grooves oriented in the horizontal direction. By this technique, also, it discloses that such ghost problem can be solved. However, when the lenticular lens sheet is combined with the Fresnel lens sheet, the drawback occurs that, as a result of the lenticular lens being added to the rear surface of the Fresnel lens sheet, the occurrence of moire is furthered.

SUMMARY OF THE INVENTION

It is an object of the present invention to provide a transmission type projection screen which, in a projection type television, enables preventing the occurrence of a ghost image due to the reflected light resulting from the reflection of a projection light from the rear surface of the screen and which has a good productivity of the elements to be added for prevention of the above mentioned ghost image, or, adding such elements does not newly further the production of moire, and a Fresnel lens sheet for use therein.

As a result of having studied how to more improve an image on the projection type television, it has become possible to attain the above-described object by forming a regular concavities and convexities configuration on the rear surface of the Fresnel lens sheet, or making the Fresnel lens side of the Fresnel lens sheet a rough surface in addition to forming such regular concavities and convexities configuration on the rear surface thereof.

According to a first aspect of the present invention, there is provided a Fresnel lens sheet comprising a Fresnel lens on one surface thereof, wherein respective unit surfaces constructing the Fresnel lens sheet have rough surfaces.

A second aspect of the present invention provides a Fresnel lens sheet according to the first aspect, wherein the arithmetic average roughness (Ra) of the rough surfaces is 0.2 $\mu$m or more.

A third aspect of the present invention provides a Fresnel lens sheet according to the first or second aspect, further comprising a regular concavities and convexities configuration for suppressing regular reflection on the surface thereof on a side opposite to the side having the Fresnel lens.

A fourth aspect of the present invention provides a Fresnel lens sheet according to the third aspect, wherein the regular concavities and convexities configuration is made up of a lenticular lens, a fly-eye lens, or prism.

According to a fifth aspect of the present invention, there is provided a Fresnel lens sheet comprising a Fresnel lens on one surface thereof, and a fly-eye lens or prisms as a regular concavities and convexities configuration for suppressing regular reflection on the surface thereof on a side opposite to the side having the Fresnel lens formed thereon.

According to a sixth aspect of the present invention, there is provided a transmission type projection screen wherein a lenticular lens sheet is disposed on a side having the Fresnel lens location of the Fresnel lens sheet according to any one of the above described first to fifth aspects.

A seventh aspect of the present invention provides a transmission type projection screen according to the sixth aspect, wherein the lenticular lens sheet has a lenticular lens on a side thereof having the location of the Fresnel lens sheet and has a light-shading layer on the surface, corresponding to a non-condensing part of the lenticular lens, located on a side thereof opposite to the side having the location of the Fresnel lens sheet.

An eighth aspect of the present invention provides a transmission type projection screen according to the sixth aspect, wherein the lenticular lens sheet has lenticular lenses on a side having the location of the Fresnel lens sheet; and the respective surfaces of the unit lenticular lenses is provided with a light-absorbing layer made of a transparent colored layer.

DESCRIPTION OF THE PREFERRED EMBODIMENTS

Figure 5A:
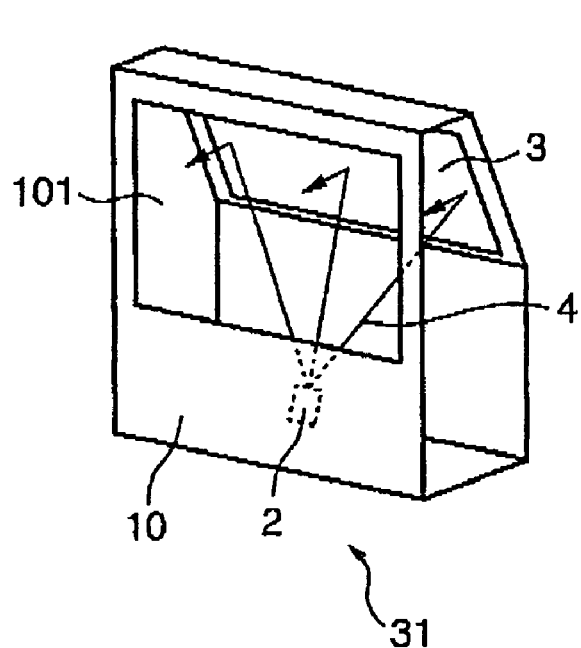
FIGS. 5A and 5B are views each illustrating a projection type television.
Figure 5B:
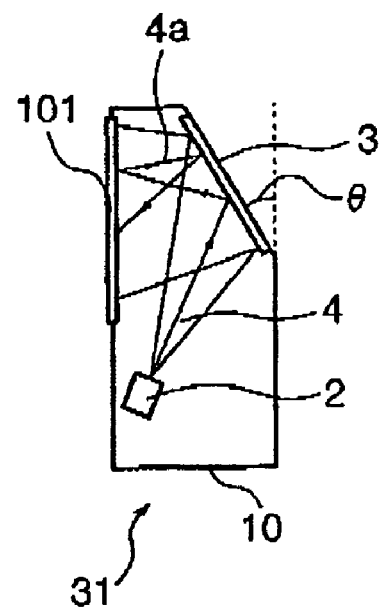
Figure 6:
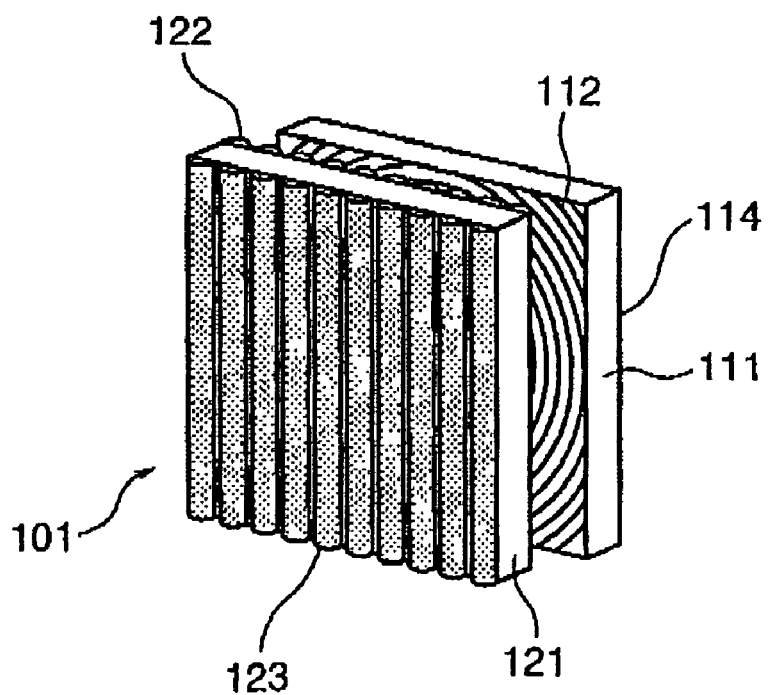
FIG. 6 is a view illustrating a conventional screen.
Figure 7:
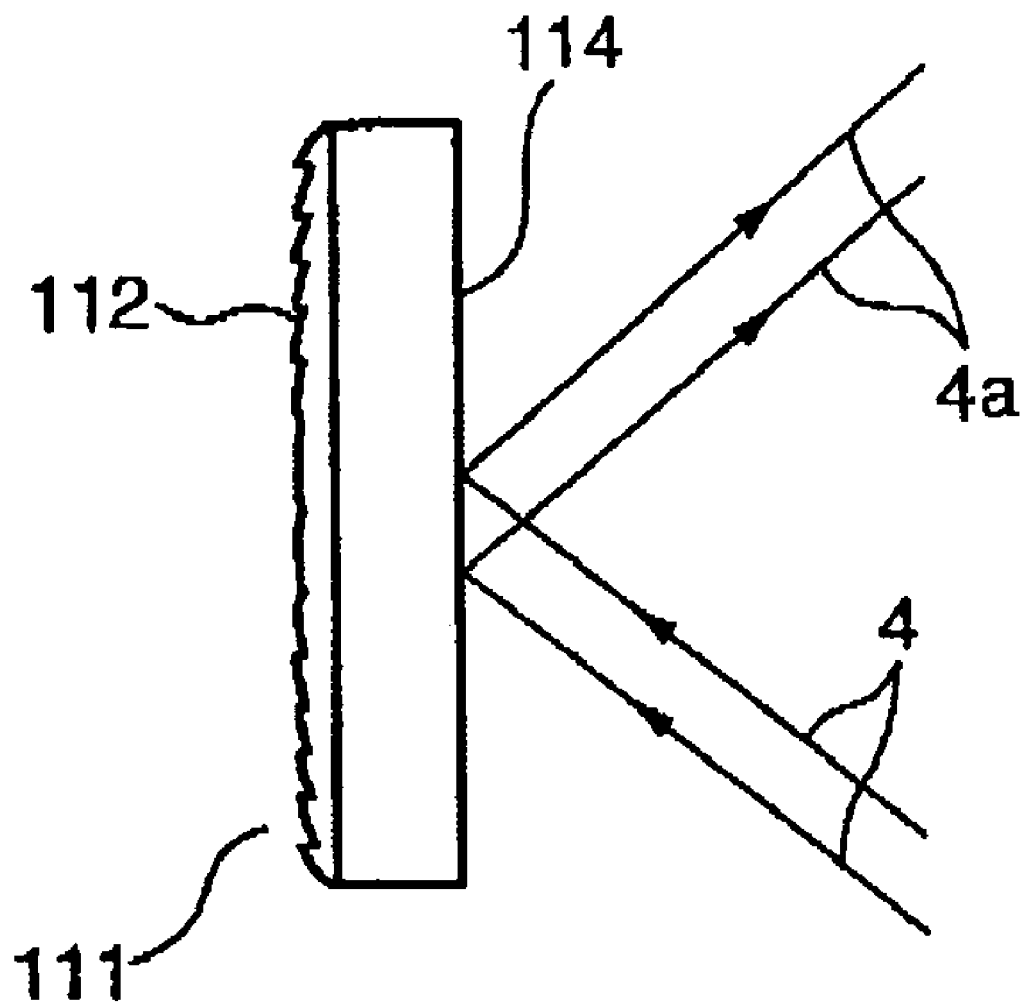
FIG. 7 is a view illustrating the reflection made by the rear surface of a conventional Fresnel lens.

As illustrated in FIG. 1, a transmission type projection screen 1 according to the present invention is the one in which a Fresnel lens 11 located on the rear surface side and a lenticular lens 21 on the viewing side are disposed in the way they are close to each other. As far as this is concerned, the projection screen 1 according to the present invention is the same as that in the prior art. Therefore, the projection screen according to the present invention can be used as a replacement of the conventional screen 101 in the projection type television 31 explained in conjunction with FIG. 5.

Figure 1A:
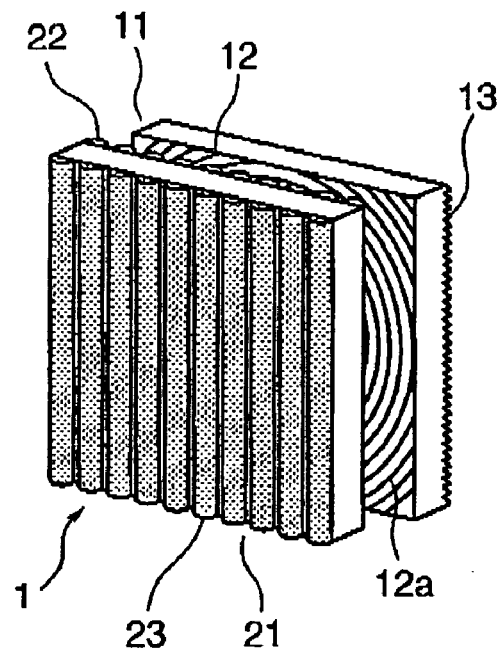
FIGS. 1A and 1B are views each illustrating a screen according to the present invention.

As illustrated in FIG. 1A, a lenticular lens sheet 21 in the transmission type projection screen 1 according to the present invention may have the same structure, explained previously, as that in the conventional case. Namely, it has a lenticular lens 22 on the rear surface side of the lenticular lens sheet 21. And, on the viewing side of the lenticular lens sheet 21, it has, at a position corresponding to a non-condensing portion of the rear surface side lenticular lens 22, a light-shading layer 23 for preventing the reflection of light that has entered from the viewing side.

Figure 1B:
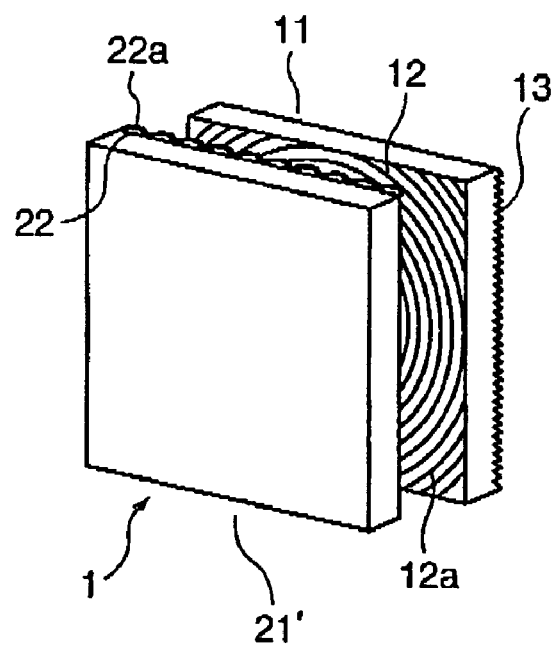

Alternatively, as illustrated in FIG. 1B, a lenticular lens sheet 21' may have a lenticular lens 22 on the rear surface side and, on the surface of this lenticular lens, it may have a light absorbing layer 22a made of a transparent colored layer. In general, when the projector is a liquid crystal panel, it is likely that moire may occur between the liquid crystal panel and the lenticular lens. Therefore, it is necessary to make the pitch of the lenticular lens small to thereby avoid the occurrence of such moire. However, in this case, the manufacture of such a lenticular lens becomes difficult to perform. For this reason, when forming the lenticular lens sheet 21', the method can be adopted of performing two-layer extrusion of colorless transparent resin (which can contain therein a light diffusion agent) and transparent colored resin, or inserting a colored film into a forming die and thereby laminating it on the lenticular lens along the configuration thereof, or performing otherwise. Namely, the light absorbing layer 22a may be the one which has been formed in those ways. The light transmitting through the light absorbing layer 22a from the rear surface side simply transmits, for the most part, through the light absorbing layer 22a. Regarding the external light that has gotten incident upon the screen from the viewing side, the distance over which it passes through the interior of the light absorbing layer 22a becomes long by total reflection and therefore the proportion in which the light is absorbed increases. Therefore, the contrast of the image increases.

The lenticular lens 22 may be the one which is integral with the lenticular lens sheet 21 or 21', or the one which is obtained by laminating the lenticular lens 22 onto a base member sheet as a separate resin layer. Regarding the configuration thereof, also, it may be the one whose cross section is circular, elliptic, or other.

Figure 2A:
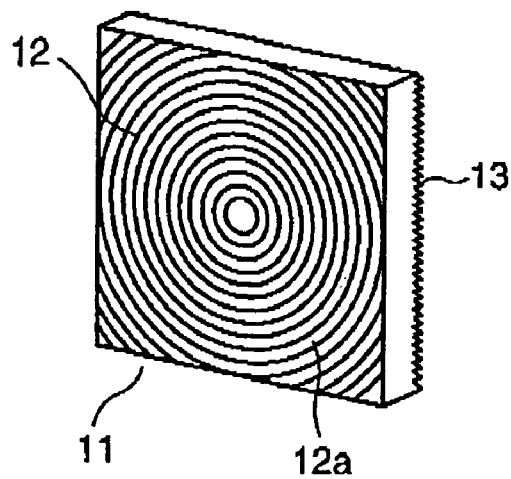
FIGS. 2A and 2B are views each illustrating a Fresnel lens sheet according to the present invention.
Figure 2B:
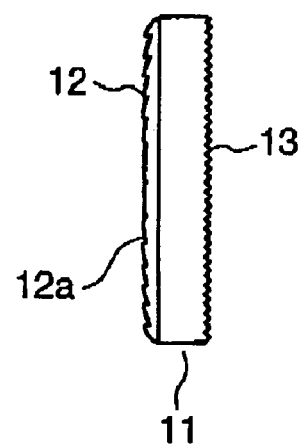

Regarding the Fresnel lens sheet 11, although it is the same as the conventional one in that it has a Fresnel lens 12 on the viewing side, it is different from the latter one in that the respective unit surfaces constructing the Fresnel lens are in the form of rough surfaces 12a. Also, in an example illustrated in FIGS. 1A/1B and 2A/2B, especially a sectional view in FIG. 2B, in the respect, as well, that the rear surface of the Fresnel lens sheet 11 has a regular concavities and convexities configuration 13, the Fresnel lens sheet 11 is different from the conventional one.

Figure 3A:
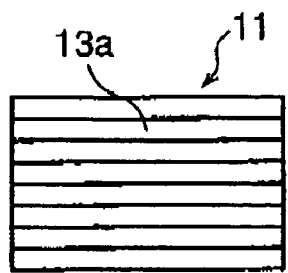
FIGS. 3A and 3A', 33 and 3B', and 3C and 3C' are views each pair of that illustrates the configuration of concavities and convexities on a rear surface of the Fresnel lens sheet.

As the regular concavities and convexities configuration 13 on the rear surface of the Fresnel lens sheet 11, a lenticular lens, especially a horizontal lenticular lens wherein unit lenticular lenses are arrayed so that the direction in which the grooves are formed may be the horizontal direction is preferable. FIG. 3A is a rear surface view of the Fresnel lens sheet 11 in which the regular concavities and convexities configuration is the horizontal lenticular lens 13a and FIG. 3A' is a longitudinal sectional view of it.

When using the horizontal lenticular lens array 13a as the regular concavities and convexities configuration on the rear surface of the Fresnel lens sheet 11, the projection light which has entered is reflected to become a reflected light with less directionality over a vertical-directional wide range. Therefore, the proportion of re-reflection by the mirror is decreased, with the result that the re-entry of the incident light that causes the ghost image is decreased very much. Also, since the incident light is vertically diffused due to the action of the horizontal lenticular lenses 13a, if the screen has the lenticular lens sheet diffusing the projection light only in the horizontal direction, the screen is generally endowed with the merit that enables widening the range within which the image can be visually recognized in the vertical direction.

Incidentally, if the lenticular lens serving as the regular concavities and convexities configuration is used solely for the purpose of preventing the occurrence of the ghost image, respective unit lenses of this lenticular lens may be disposed not horizontally but vertically or slantwise.

Figure 3B:
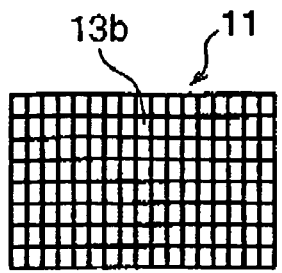

As the regular concavities and convexities configuration 13 on the rear surface of the Fresnel lens sheet 11, it may be the so-called fly-eye lens wherein isotropic or anisotropic unit lenses are arrayed in the form of a matrix wherein, for example, they are arrayed vertically and laterally. FIG. 3B is a rear surface view of the Fresnel lens sheet 11 whose regular concavities and convexities configuration is a fly-eye lens 13b while FIG. 3B' is a perspective view of the rear surface of that sheet 11.

When using the fly-eye lens 13b, the incident light is reflected over a wide range including the horizontal direction and vertical direction and, in addition, the horizontal and vertical visually recognizable range of the screen can be controlled.

Figure 3C:
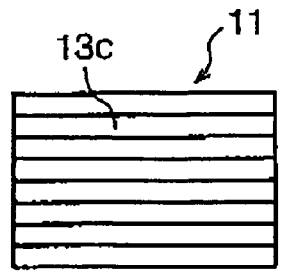
Figure 3A:
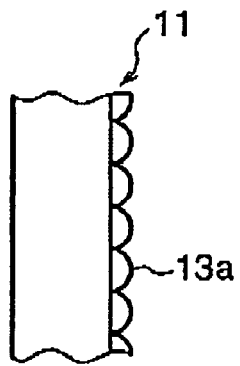
Figure 3B:
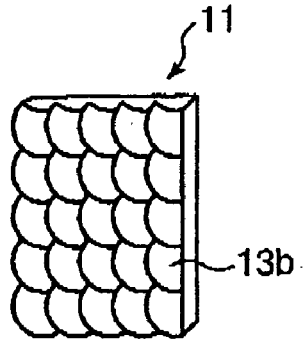
Figure 3C:
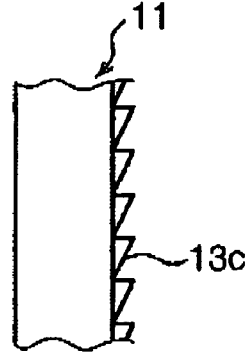

As the regular concavities and convexities configuration 13 on the rear surface of the Fresnel lens sheet 11, it may be the one wherein prism members are arrayed, especially wherein they have grooves in the horizontal direction and can reflect the incident light in the up-and-down direction. FIG. 3c is a rear surface view of the Fresnel lens sheet wherein the regular concavities and convexities configuration is constructed of prism members 13c while FIG. 3C' is a longitudinal sectional view of the prism members. The prism members in these figures are the ones wherein, as in the case of the horizontal lenticular lens illustrated in FIG. 3A, the prism members whose individual cross sections are triangular respectively are disposed so that the groove formed when the prism members have been arrayed each other may extend in the horizontal direction.

In a case where such prism members 13c are disposed on the rear surface of the Fresnel lens sheet, the projection light that has entered a prescribed one of the arrayed prism members is reflected in a prescribed direction. Therefore, it is preferable to adjust the angle of each surface of the prism member in advance so that, after the reflected light has again been reflected by the mirror, this reflected light does not enter the screen.

Figure 4A:
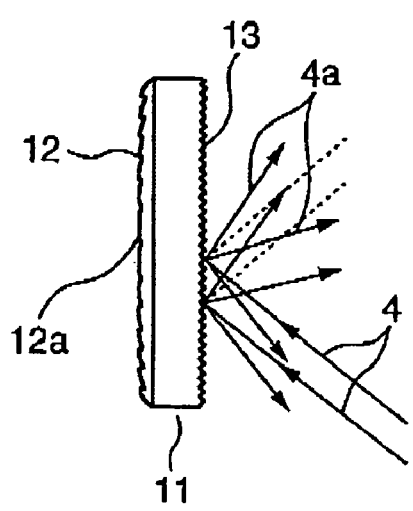
FIGS. 4A and 4B are views each illustrating the reflection made by the rear surface of the Fresnel lens sheet.
Figure 4B:
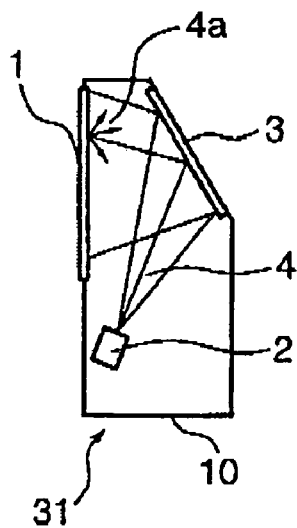

By the Fresnel lens sheet 11 being equipped with the regular concavities and convexities configuration 13a, 13b, or 13c such as that illustrated in FIG. 3A, 3B, or 3C, in contrast to the conventional technique wherein the rear surface of the Fresnel lens sheet 11 is a flat surface and therefore the projection light 4 is regularly reflected in the directions indicated in broken lines in FIG. 4, the invention enables the projection light 4 to be reflected according to the surface configuration of the regular concavities and convexities configuration 13 and as a result this light becomes reflected light rays oriented in various directions. Therefore, since the regular reflection that occurs when the rear surface is a flat surface is suppressed, the occurrence of the phenomenon that the projection light thereafter is again reflected by the mirror and re-enters the rear surface of the Fresnel lens sheet 11 is suppressed and this can prevent the appearance of the ghost image.

In the present invention, in a case where making the respective unit surfaces constructing the Fresnel lens 12 of the Fresnel lens sheet 11 rough surfaces, when having constructed the screen by combining it with the lenticular lens sheet, that concavo-convex configuration of the Fresnel lens 12 becomes difficult to see when watching the screen via the lenticular lens sheet 21. Therefore, it becomes difficult for interference to occur between the Fresnel lens 12 and the lenticular lens 22. As a result, it is possible to suppress the occurrence of moire.

Also, in a case, as well, where having the regular concavities and convexities configuration 13 on the rear surface of the Fresnel lens sheet 12, that concavities and convexities configuration 13 becomes difficult to see from the Fresnel lens 12 side, or the viewing side of the lenticular lens sheet 21. Therefore, it becomes unlikely that interference occurs between or among the regular concavities and convexities configuration 13, Fresnel lens 12, and lenticular lens 22. This also can lead to suppressing the occurrence of moire.

As the surface roughness of the rough surfaces 12a of this Fresnel lens, preferably, it is 0.2 $\mu$m or more in terms of the arithmetic average roughness (Ra). When the arithmetic average roughness (Ra) is smaller than 0.2 $\mu$m, the above-described effect that the Fresnel lens 12 or regular concavities and convexities configuration 13 becomes difficult to see weakens with the result that moire becomes outstanding. On the other hand, when the arithmetic average roughness (Ra) becomes excessively large, it has an undesirable effect upon the refraction property of the Fresnel lens and therefore it is preferable that the roughness (Ra) be 100 $\mu$m or less.

The rough surface 12a of the Fresnel lens can also be obtained by roughening each of the respective unit surfaces constructing the Fresnel lens 12 which are made into smooth surfaces beforehand. However, ordinarily, the rough surface 12a is obtained by having previously roughened the die surface of a die for forming the Fresnel lens by sand blast, beads blast, chemical etching, etc. and forming the Fresnel lens sheet 11 with the use of such die.

According to the present invention as described in the first aspect, since the Fresnel lens has a rough surface, it is possible to provide a Fresnel lens sheet which, when making up a screen by using the Fresnel lens, enables suppressing the occurrence of moire attributable to the configuration of the Fresnel lens sheet.

According to the present invention as described in the second aspect, in addition to the effect of the invention as described in the first aspect, since the arithmetic average roughness of the rough surfaces has been defined, it is possible to provide a Fresnel lens sheet which enables more reliably suppressing the occurrence of moire attributable to the configuration of the Fresnel lens sheet.

According to the present invention as described in the third aspect, in addition to the effect of the invention as described in the first or second aspect, since the Fresnel lens sheet has been formed in the way of having the regular concavities and convexities configuration on its rear surface, it is possible to provide a Fresnel lens sheet which enables suppressing the occurrence of ghost image due to the reflection of the projection light by that rear surface.

According to the present invention as described in the fourth aspect, in addition to the effect of the invention as described in the third aspect, since the regular concavities and convexities configuration has been specifically defined, it is possible to provide a Fresnel lens sheet which enables reliably performing the formation of the regular concavities and convexities configuration.

According to the present invention as described in the fifth asepct, since the Fresnel lens sheet has on its rear surface a fly-eye lens or a prism, it is possible to provide a Fresnel lens sheet which enables suppressing the occurrence of ghost image due to the reflection of the projection light by that rear surface.

According to the present invention as described in the sixth aspect, it is possible to provide a transmission type projection screen capable of exhibiting the effect of the Fresnel lens sheet according to the invention as described in any one of the first to fifth aspects, by combining it with the lenticular lens sheet.

According to the present invention as described in the seventh aspect, in addition to the effect of the invention as described in the sixth aspect, since the lenticular lens sheet has been made the one having a light-shading layer, it is possible to provide a transmission type projection screen capable of suppressing the reflection of external light from the viewing side.

According to the present invention as described in the eighth aspect, in addition to the effect of the invention as described in the sixth aspect, since the lenticular lens sheet has been formed in the way of having a light-absorbing layer on its light-incident side, it is possible to provide a transmission type projection screen in which the occurrence of moire is less; and especially even when performing projection using a liquid crystal projector, the occurrence of moire is less.

EXAMPLE

Taking up concrete manufactured examples, that the occurrence of ghost image and moire has been prevented is shown below. It is to be noted that the reference symbols in the explanation made below are used from within FIG. 1 or S.

Manufactured Example 1

Various relevant values of the projection type television 31 were set as follows. The viewing screen size of the screen 1: 1270 mm (50 inch type), the projection distance: 870 mm, the distance from the center of the screen 1 to the center of the mirror 3: 390 mm, and the angle of inclination of the mirror 3 (the angle indicated by θ in FIG. 5B: 35° from the vertical line.

As the Fresnel lens sheet 11, there was manufactured the one which had on one side a Fresnel (convex) lens 12 with the pitch: 0.126 mm, the focal distance ~800 mm and the arithmetic average roughness (Ra) of respective unit surfaces of the obverse surface: 0.26 μm, and which had on the opposite side surface a horizontal lenticular lens 13a with the lens pitch: 0.09 mm and the cross section: part of a circle having a diameter of 0.2 mm, the horizontal lenticular lenses 13a being densely arrayed and thereby made into the regular concavities and convexities configuration, and which had the thickness of 2 mm.

As the lenticular lens sheet 21' there was manufactured the one which contained therein a diffusion agent in its interior and which had on one side a (vertical) lenticular lens 22 with the lens pitch: 0.161 mm, the cross section: part of a circle having a diameter of 0.87 mm, the lenticular lens 22 having provided thereon a light absorbing layer with the thickness: 20 μm, the light absorbance: 40% and the thickness: 1 mm by an extrusion molding method using an acrylic resin.

Manufactured Example 2

Various relevant values of the projection type television 31 were made the same as in the manufactured example 1.

As the Fresnel lens sheet 11, there was manufactured the one which had on one side a Fresnel (convex) lens 12 with the pitch: 0.16 mm, the focal distance: 800 mm and the arithmetic average roughness (Ra) of respective unit surfaces of the obverse surface: 0.35 μm, and which had on the opposite side surface a horizontal lenticular lens array 13a with the lens pitch 0.114 mm, the cross section: part of a circle having a diameter of 0.3 mm, the horizontal lenticular lenses 13a being densely arrayed and thereby made into the regular concavities and convexities configuration, and which had the thickness of 2 mm.

As the lenticular lens sheet 21, there was manufactured, the one which contained therein a diffusion agent in its interior and which had on one side a (vertical) lenticular lens 22 with the lens pitch: 0.24 mm, the cross section: part of a circle having a diameter of 0.13 mm, the lenticular lens 22 having provided on the surface corresponding to its non-condensing portion a black stripe with the width: 0.15 mm, and the thickness: 0.34 mm by an extrusion molding method using an acrylic resin.

The Fresnel lens sheet 11 and lenticular lens sheet 21' manufactured in the manufactured example 1, and the Fresnel lens sheet 11 and lenticular lens sheet 21 manufactured in the manufactured example 2, were, each, arranged to overlap each other so that the Fresnel lens 12 and the lenticular lens 22 may face each other, to thereby make up a screen 1. Then, using a liquid crystal projector 2 having 500 ANSI lumens (the ANSI lumen is a unit representing the lightness of the liquid crystal projector), projection was performed to the screen 1 from the horizontal lenticular lens array 13a side of the Fresnel lens sheet 11.

In the screen of either the manufactured example 1 or the manufactured example 2, when projection was performed, no ghost image attributable to the reflection by the rear surface of the screen occurred and a clear image could be viewed. In addition, moire attributable to the existence of the horizontal lenticular lens on the rear surface of the Fresnel lens sheet 11 did not occur, either. However, when using the screen in which the arithmetic average roughness (Ra) of the respective unit surfaces on the Fresnel lens 12 surface was 0.17 μm and the other relevant values of which were the same as in the manufactured example 1, although no ghost image occurred, radial moire was viewed.

What is claimed is:

1. A Fresnel lens sheet comprising a circular Fresnel lens on one surface thereof and a regular concavities and convexities configuration on the other surface thereof for suppressing regular reflection, wherein respective unit surfaces constructing the circular Fresnel lens sheet have rough surfaces for making hard to see the regular concavities and convexities configuration from the side of the circular Fresnel lens, wherein the regular concavities and convexities configuration has a pitch size that is at least 10 times larger than the arithmetic average roughness (Ra) of the rough surface.

2. A Fresnel lens sheet according to claim 1, wherein the arithmetic average roughness (Ra) of the rough surfaces is 0.2 μm or more.

3. A Fresnel lens sheet according to claim 2, wherein the arithmetic average roughness (Ra) of the rough surfaces is 0.2 μm or more.

4. A Fresnel lens sheet according to claim 2, wherein the arithmetic average roughness (Ra) of the rough surfaces is 100 μm or less.

5. A Fresnel lens sheet according to claim 1, wherein the regular concavities and convexities configuration is made up of a lenticular lens, a fly-eye lens, or prism.

6. A transmission type projection screen comprising a Fresnel lens sheet and a lenticular lens sheet, wherein the Fresnel lens sheet and the lenticular lens sheet have a positional relationship such that the Fresnel lens sheet is disposed on the side closer to a light source side and the lenticular lens sheet is disposed on the side closer to the viewing side, wherein the Fresnel lens sheet is provided with a circular Fresnel lens on one surface thereof and a regular concavities and convexities configuration on the other surface thereof for suppressing regular reflection, and the Fresnel lens sheet arranged with the surface having the regular concavities and convexities configuration facing the light source side, wherein the lenticular lens sheet is provided with a lenticular lens on one surface thereof, the surface having the lenticular lens facing the Fresnel lens sheet side, wherein respective unit surfaces constructing the circular Fresnel lens have rough surfaces for suppressing interference between the regular concavities and convexities configuration of the Fresnel lens sheet and a lenticular lens of the lenticular lens sheet.

7. A transmission type projection screen according to claim 6, wherein the lenticular lens sheet has a lenticular lens on a side thereof having the location of the Fresnel lens sheet and has a light-shading layer on the surface, corresponding to a non-condensing part of the lenticular lens, located on a side thereof opposite to the side having the location of the Fresnel lens sheet.

8. A transmission type projection screen according to claim 6, wherein the lenticular lens sheet has lenticular lenses on a side having the location of the Fresnel lens sheet; and the respective surfaces of the unit lenticular lenses is provided with a light-absorbing layer made of a transparent colored layer.

9. A transmission type projection screen according to claim 6, wherein the arithmetic average roughness (Ra) of the rough surfaces is 0.2 μm or more.

10. A transmission type projection screen according to claim 9, wherein the arithmetic average roughness (Ra) of the rough surfaces is 0.2 μm or more.

11. A transmission type projection screen according to claim 9, wherein the arithmetic average roughness (Ra) of the rough surfaces is 1001 μm or less.

12. A transmission type projection screen according to claim 6, wherein the regular concavities and convexities configuration is a lenticular lens, fly-eye lens, or prism.

13. A transmission type projection screen according to claim 6, wherein the regular concavities and convexities configuration has a pitch size that is at least 10 times larger than the arithmetic average roughness (Ra) of the rough surface.

* * * * *